United States Patent [19]

Baron, Jr. et al.

[11] Patent Number: 4,894,119

[45] Date of Patent: Jan. 16, 1990

[54] RETENTION AND/OR DRAINAGE AND/OR DEWATERING AID

[75] Inventors: Joseph J. Baron, Jr., Morris Plains; Tamara Nowakowski, Boonton Township, Morris County; Thomas A. Farrington, Sparta; Frederick R. Mahn, Verona, all of

[73] Assignee: Drew Chemical Corporation, Boonton, N.J.

[21] Appl. No.: 721,876

[22] Filed: Apr. 10, 1985

[51] Int. Cl.[4] .............................................. D21H 3/38
[52] U.S. Cl. ................................ 162/168.2; 162/168.3
[58] Field of Search ................ 162/168.1, 168.2, 168.3

[56] References Cited

U.S. PATENT DOCUMENTS 4,250,269 2/1981 Buckman et al. .................... 162/167

*Primary Examiner*—Peter Chin
*Attorney, Agent, or Firm*—Elliot M. Olstein; John G. Gilfillan, II; Raymond J. Lillie

[57] ABSTRACT

A combination of a cationic polymer and a nonionic polymer are employed as a drainage and/or dewatering and/or retention aid. The combination has particular applicability to improving retention and/or drainage in the papermaking industry by addition of the combination to the pulp stock.

10 Claims, No Drawings

RETENTION AND/OR DRAINAGE AND/OR DEWATERING AID

This invention relates to drainage and/or dewatering and/or retention aids. More particularly, this invention relates to improving the production of paper by use of an improved drainage and/or retention aid.

In many processes, there is a need for a drainage aid and/or retention aid and/or dewatering aid. Thus, for example, in the paper making industry, water is drained from the formed-paper, and such draining is generally improved by adding a drainage- aid to the pulp stock. In most cases, such a drainage aid is comprised of either a cationic polymer, or in some cases, a mixture of an anionic and a cationic polymer In addition to the use of drainage aids, the paper making industry also employs retention aids in order to increase the retention of solids on the screen or wire of the cylinder or Fourdrinier machine. In general, such retention aids are comprised of either a cationic polymer, or in some cases, a mixture of a cationic polymer and an anionic polymer.

In accordance with an aspect of the present invention, there is provided an improvement in a retention aid and/or a drainage aid and/or a dewatering aid by use of both a cationic polymer and a nonionic polymer.

In accordance with another aspect of the present invention, there is provided an improvement in the paper making industry by adding to the pulp or paper making stock an effective amount of both a nonionic polymer and a cationic polymer.

The use of both a cationic and nonionic polymer improves both drainage and retention during the paper making process.

The nonionic polymer is preferably a-polyacrylamide. The polyacrylamide generally has a molecular weight (weight average m.w.) of at least 1,000,000. In most cases, the molecular weight does not exceed 25,000,000. The acrylamide polymer which is employed is water soluble in the amount required for improving retention and/or drainage and/or dewatering. Although a homopolymer of acrylamide is preferred, other nonionic polymers may be employed; e.g., polyethyleneoxide.

The other component is a cationic polymer. As one type of cationic polymer which may be employed for the purposes of the present invention, there may be mentioned a cationic polyacrylamide, which is a copolymer of acrylamide with a cationic monomer. The cationic monomer may be employed in neutralized or quaternized form.

As one type of cationic monomer, which may be copolymerized with acrylamide, there may be mentioned aminoalkyl esters of acrylic or methacrylic acid. Such monomers may be represented in neutral and quaternized form by the following structural formula:

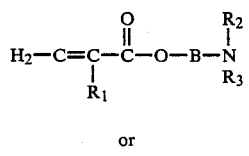

or

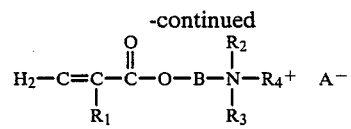

wherein
$R_1$ is hydrogen or methyl;
B is $C_2$–$C_6$, preferably $C_2$ or $C_3$;
$R_2$, $R_3$ and $R_4$ are each lower alkyl (1-6 carbon atoms), preferably $C_1$ or $C_2$; and
$A-$ is an appropriate anion such as $Cl-$ or methosulfate ($-SO_4CH_3$).

As representative examples of preferred monomers of this type, there may be mentioned methacryloyl ethyl trimethyl ammonium methosulfate; methacryloyl ethyl trimethyl ammonium chloride.

As another type of cationic monomer which may be copolymerized with acrylamide, there may be mentioned diallylamines in either neutralized or quaternized form, as represented by the following structural formula:

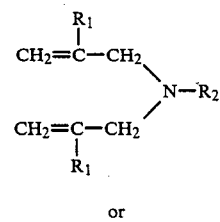

or

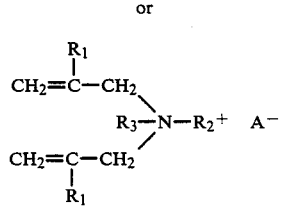

wherein
$R_1$ is methyl or hydrogen,
$R_2$ and $R_3$ are lower alkyl (1-6 carbon atoms, preferably methyl) and
$A-$ is an appropriate anion such as chloride.

A preferred comonomer is dimethyl diallyl ammonium chloride.

It is to be understood that cationic polyacrylamides may also be formed from comonomers other than those particularly described; for example, 1-trimethylammonium - 2-hydroxypropylmethacrylate methosulfate, 1-trimethylammonium - 2-hydroxypropylacrylate methosulfate, 3-methacrylamido propyl trimethyl ammonium chloride, etc.

In employing a cationic polyacrylamide, in general, in such a copolymer, the nonionic acrylamide units are present in the polymer in an amount of at least 30 mol %, and generally in an amount of no greater than 95 mol%. At least about 5 mol %, and generally no greater than about 70 mol % of the polymer is formed from a cationic comonomer.

In employing such a cationic polyacrylamide as the cationic polymer employed in the present invention, in general, the molecular weight (weight average m.w.) of the polymer is at least about 10,000 and in most cases is no greater than about 15,000,000.

As a further example of a cationic polymer which may be employed for the purposes of the present invention, there may be mentioned homopolymers of diallylamine monomers of the type represented by hereinabove structural formula II. In general, such homopolymers would have a molecular weight (weight average m.w.) of at least about 10,000, and in most cases, the molecular weight would not exceed about 10,000,000. Preferably, the molecular weight is at least about 50,000, and preferably no greater than 500,000.

As a further example of a cationic polymer which may be employed for the purposes of the present invention, there may be mentioned homopolymers of aminoalkyl esters of acrylic acids of the type represented by hereinabove structural formula I. In employing such cationic polymers, in general, the molecular weight (weight average m.w.) is at least about 10,000, and in most cases, the molecular weight does not exceed about 5,000,000. The molecular weight is preferably at least 50,000, and preferably no greater than about 3,000,000.

As still another example of cationic polymers which may be used for the purposes of the present invention, there may be mentioned polyamines; e.g., formed by condensation of a diamine or triamine with an alkyl chloride; condensation of epichlorohydrin with dimethyl amine, etc.

In using the cationic polymer and nonionic polymer for the purposes of the present invention, such polymers may be introduced into the system in which they are to be used in a variety of forms, such as, for example, suspended in oil (hydrocarbon), as a water-in-oil emulsion, as an aqueous solution, etc. The manner of producing such polymers in such forms is well known in the art, and as a result, no further details in this respect are needed for a complete understanding of the present invention.

In employing both a cationic and a nonionic polymer in accordance with the present invention, in general, such polymers are separately added to the aqueous system in which they are to be used. It is to be understood, however, that in some cases, it may be possible to premix such polymers prior to addition; however, in accordance with a preferred embodiment, such polymers are separately added to the system.

As hereinabove indicated, the present invention is particularly applicable to the papermaking industry wherein a combination of a cationic polymer and a nonionic polymer is employed as a drainage and/or retention aid. Both the nonionic and cationic polymer are added to the system in amounts effective to improve drainage and/or retention. In general, the nonionic polymer is added in an amount of at least 0.05 #/ton of paper stock, based on dry solids, and preferably in an amount of at least 0.1 #/ton. In most cases, it is not necessary to add the nonionic polymer in an amount which exceeds 5.0 #/ton.

The cationic polymer is also added to the system in an amount effective to improve drainage and/or retention. In general, the cationic polymer is added in an amount of at least 1.0 #/ton of paper stock, based on dried solids, and preferably in an amount of at least 2.5 #/ton. In most cases, the cationic polymer is not added in an amount in excess of 6 #/ton.

In employing a combination of a cationic polymer and a nonionic polymer in effective amounts, in general, in the system, the ratio of nonionic to cationic polymer is at least 1:120, and preferably at least 1:25. In most cases, the ratio of nonionic polymer to cationic polymer does not exceed about 5:1.

In employing the combination of a cationic and nonionic polymer in the papermaking industry in order to improve drainage and/or retention, the polymer may be added to the papermaking system, at a variety of points, prior to the Fourdrinier machine, with the polymers preferably being added subsequent to the refining step. For example, the polymers may be added to the fan pump, headbox, wire pit, etc., prior to actual formation of the paper sheet.

Although the present invention has applicability to preparation of paper from a wide variety of pulp stocks, it has particular applicability to paper produced from lower quality stocks, such as recycled paper stock.

Although the present invention has particular applicability to the papermaking industry, a combination of a nonionic polymer and a cationic polymer is also suitable for use in the treatment of sewage and industrial wastes so as to effect the dewatering of same. As known in the art, in treating sewage and other industrial wastes, it is necessary to separate the water from the solids so as to permit disposal of clarified water, as well as to reduce the cost of transporting the remaining sludge. It has been found that the combination of a cationic polymer and a nonionic polymer is extremely useful for effecting such dewatering by adding an effective dewatering amount thereof to an industrial waste or sewage. In general, the nonionic polymer is added in an amount of at least 1 #/ton dry solids and no greater than 10 #/ton dry solids. It is preferred that the nonionic polymer be added in an amount of at least 2.0 #/ton.

The cationic polymer is added in an amount of at least #/ton dry solids, and in most cases it is not necessary to add the cationic polymer in an amount in excess of 10 #/ton dry solids. Preferably, the cationic polymer is added in an amount of at least 2.5 #/ton.

In employing a combination of a cationic polymer and a nonionic polymer for such purposes, in general, in the system, there is provided a ratio of nonionic polymer to cationic polymer of at least 1:10, and preferably at least 1:5, and in most cases, the ratio does not exceed about 5:1.

The present invention is broadly applicable to separating water from solids in which a mixture of solids and water are applied to a porous surface, which is porous to the water and retains solids, and includes filters, as well as screens and cylinders used in the papermaking process. The present invention will be further described with respect to the following examples; however, the scope of the invention is not to be limited thereby:

EXAMPLE

In the following test, the nonionic polymer is a polyacrylamide homopolymer having a molecular weight (weight average m.w.) of about 15,000,000. The cationic polymer is a homopolymer of dimethyldiallyl ammonium chloride having a molecular weight of about 100,000. The anionic polymer is a copolymer of acrylamide (70%) and potassium acrylate (30%) having a molecular weight of about 20,000,000.

The polymer systems were tested with respect to a deinked recycle pulp stock.

In the first polymer system tested, the cationic polymer was employed in a dosage of 0.1% based on oven-dried pulp or 2 #/ton. Three minutes after addition of the cationic polymer at a low mixing rpm (250), the anionic polymer was added in the dosage levels shown.

The test for Canadian standard freeness was run ten seconds after the second polymer was added. The test measures the rate at which a suspension of 3 grams of pulp in 1 liter of water is drained.

The second polymer system was identical to the first, except that the nonionic polymer was used instead of the anionic polymer.

The results were as follows:

|  | POLYMERS | #/TON | CSF |
|---|---|---|---|
| Cationic (0.100%) | + 0.075% Anionic | 1.5 | 70 ml. |
|  | + 0.100% Anionic | 2.0 | 65 ml. |
|  | + 0.125% Anionic | 2.5 | 50 ml. |
|  | + 0.150% Anionic | 3.0 | 60 ml. |
|  | + 0.075% Nonionic | 1.5 | 135 ml. |
|  | + 0.100% Nonionic | 2.0 | 150 ml. |
|  | + 0.125% Nonionic | 2.5 | 150 ml. |
|  | + 0.150% Nonionic | 3.0 | 160 ml. |
|  | Blank |  | 140 ml. |

As should be apparent from such results, the system of the present invention which employs a combination of cationic polymer and nonionic polymer results in an increase in the Canadian standard freeness.

The vacuum water release was analyzed with respect to various polymer systems. In the test( a one gram sheet, four inches in diameter of the deinked paper stock was formed under 8 inches of mercury vacuum on a 100 mesh nickel screen. After formation, the sheet was exposed to a higher vacuum of 20 inches of mercury for 20 seconds. The dryness of the sheet was then determined, and the final vacuum reading from the gauge was recorded. For sheet formation, the stock was treated with the polymers and diluted to 250 ml. The results from the tests are as follows:

|  | #/TON | DRYNESS (%) | FINAL VACUUM (in Hg) |
|---|---|---|---|
| Blank |  | 28.1 | 18.7 |
| Cationic + 0.075% Anionic | 1.5 | 16.7 | 20.0 |
| Cationic + 0.100% Anionic | 2.0 | 16.4 | 20.0 |
| Cationic + 0.125% Anionic | 2.5 | 15.0 | 20.0 |
| Cationic + 0.150% Anionic | 3.0 | 15.8 | 20.0 |
| Cationic + 0.075% Nonionic | 1.5 | 29.6 | 17.0 |
| Cationic + 0.100% Nonionic | 2.0 | 32.1 | 16.6 |
| Cationic + 0.125% Nonionic | 2.5 | 30.8 | 16.2 |
| Cationic + 0.150% Nonionic | 3.0 | 29.5 | 14.2 |

The dryness of the sheet (or moisture content) and the final vacuum reading are two ways of indicating how little water remained in the sheet as a consequence of drainage.

The final test was fines retention, using the "Britt Dynamic Jar". The tests were run using a 200 mesh and a 70 mesh screen, both with agitation controlled at 750 r.p.m. Fines are defined in the results according to what passes through the screen used in the test. Due to the plugging problems which occurred on the screens using the anionic polymer system, only the nonionic polymer system was able to be tested. The results are as follows:

|  | #/TON | 200 MESH | 70 MESH |
|---|---|---|---|
| Blank |  | 32.9% | 19.3% |
| Cationic + 0.075% Nonionic | 1.5 | 55.1% | 28.5% |
| Cationic + 0.100% Nonionic | 2.0 | 67.7% | 33.4% |
| Cationic + 0.125% Nonionic | 2.5 | 74.4% | 43.7% |
| Cationic + 0.150% Nonionic | 3.0 | 77.6% | 57.2% |

These results show that there is an increase in the retention of fines on each screen as the dosage of the nonionic polymer is increased.

The present invention is particularly advantageous in that it is possible to increase both drainage and retention in a papermaking system. Moreover, the dryness for the paper is also improved. In accordance with the present invention, such retention, drainage and sheet dryness can be simultaneously improved at various levels of turbulence in the paper making system thereby enabling increased production rates in a given unit of time.

As hereinabove indicated, although the present invention is particularly applicable to papermaking, similar advantages can be achieved in other systems for separating water and solids by applying a mixture of solids and water to a porous surface on which the solids are retained.

These and other advantages should be apparent to those skilled in the art from the teachings herein.

Numerous modifications and variations of the present invention are possible in light of the above teachings and, therefore, within the scope of the appended claims, the invention may be practiced otherwise than as particularly described.

What is claimed is:

1. A process for improving the retention and/or drainage in the manufacture of paper, comprising:
   adding to a paper pulp stock prior to forming a paper sheet an effective amount consisting essentially of both a nonionic polymer and a cationic polymer wherein the nonionic polymer is polyacrylamide and the only cationic polymer added is selected from the group consisting of copolymers of acrylamide and a cationic monomer, diallylamine polymers and polymers of aminoalkyl esters of acrylic and methacrylic acid.

2. The process of claim 1 wherein in the copolymer of acrylamide and a cationic monomer, the cationic monomer is selected from the group consisting of aminoalkyl esters of acrylic and methacrylic acid.

3. The process of claim 2 wherein the cationic polymer is a copolymer of acrylamide and a cationic monomer.

4. The process of claim 3 wherein the cationic monomer is a diallylamine polymer.

5. The process of claim 2 wherein the cationic polymer is a polymer of an amine alkyl ester of acrylic acid.

6. The process of claim 2 wherein the cationic polymer is a polymer of an amino alkyl ester of methacrylic acid.

7. The process of claim 2 wherein the paper pulp stock is a recycled paper stock.

8. The process of claim 2 wherein the nonionic polymer is added in an amount of at least 0.05 pound and the cationic polymer in an mount of at least one pound, both based on one ton of dried solids of the paper pulp stock.

9. The process of claim 1 wherein the cationic polymer is a dimethyldiallylamine polymer.

10. The process of claim 9 wherein the cationic polymer is a homopolymer of dimethyldiallyl ammonium chloride.

* * * * *